July 29, 1969 R. K. WAITS 3,458,847

THIN-FILM RESISTORS

Filed Sept. 21, 1967 2 Sheets-Sheet 1

INVENTOR.
ROBERT K. WAITS
BY Roger A. Bonvoy
ATTORNEY

July 29, 1969 R. K. WAITS 3,458,847

THIN-FILM RESISTORS

Filed Sept. 21, 1967 2 Sheets-Sheet 2

INVENTOR.
ROBERT K. WAITS

BY Roger S. Borovoy

ATTORNEY

United States Patent Office 3,458,847

Patented July 29, 1969

3,458,847

THIN-FILM RESISTORS

Robert K. Waits, Palo Alto, Calif., assignor to Fairchild Camera and Instrument Corporation, Syosset, N.Y., a corporation of Delaware Filed Sept. 21, 1967, Ser. No. 669,424
Int. Cl. H01c *1/02, 13/00*
U.S. Cl. 338—320 2 Claims

ABSTRACT OF THE DISCLOSURE

An insulating underlayer is formed over a portion of an insulating substrate to create two surfaces wherein the microstructure variations of one surface are substantially different from the microstructure variations of the other. One or more resistive films are then formed over a portion of the underlayer surface and one or more other resistive films are formed over a portion of the substrate surface, whereby the deposited films may have the same geometry and composition of material, but will have substantially different values of resistance. Preferably, the resistive films are not thicker than 250 angstroms.

Background of the invention

*Field of the invention.*—This invention relates to a method of fabricating a plurality of metal thin-film resistors having substantially different resistive values in a single semiconductor device. In particular, this invention relates to at least two thin-film resistors in which the composition of the resistive material may be the same, but the resistivity of one resistive film is up to ten times greater than the resistivity of the other.

*Description of the prior art.*—In the fabrication of semiconductor devices, such as integrated circuits and complex circuit arrays, it is often necessary that two or more resistors having different resistive values be formed within the device itself. Ideally, the resistors should be accurate, stable, reliable, and immune to changes in ambient conditions. In addition, the process for fabricating the resistors should comprise the simplest steps possible, enabling high-volume production of the overall device at a low cost per unit. It should be mentioned that the resistance, R, of a thin-film resistor is determined by the product of its sheet resistance, $\rho_S$, times the number of squares; that is, $R=\rho_S\times$number of squares. The number of squares, sometimes referred to as the aspect ratio, depends upon the resistor geometry. For example, with a rectangular resistor, the number of squares is equivalent to the film length $l$, divided by the film width $w$; the resistance then, is $$R=\rho_S\times\frac{l}{w}$$

The sheet resistance, on the other hand, is determined by the film resistivity $\rho$, divided by the film thickness $t$; that is, $\rho_S=\rho/t$. Finally, the film resistivity depends upon the composition and structure of the material which comprises the film itself.

A number of prior art methods have been tried for forming resistors having substantially different resistor values within a semiconductor device, none of which has proved to be entirely satisfactory. For example, it is possible to vary the film resistivity by changing the composition of the material used to form the resistor. Such a method may include depositing two thin-film resistors having different resistive materials upon the device surface; or, on the other hand, the method may comprise depositing one thin-film resistor upon the device surface and forming another resistor by the diffusion of impurities into the device substrate. Two separate masking steps are required, however, in order to delineate each of the two types of resistors. A second disadvantage occurs when one resistor has a temperature coefficient that is different from the other. The ratio between resistor values can vary with changes in temperature, an undesirable characteristic in many applications.

In another method, the geometry of one resistor with respect to another is changed, causing the number of squares of each to be different. For example, if two resistors are of equal width, one resistor might be formed two or three times as long as a second one, thus increasing the ratio between the overall resistance values by a factor of two or three. However, this method is considered impractical when the ratio between two different resistors approaches a value of about 200 to 1, owing to the difficulty of accurately forming resistor geometries differing by such a large amount.

It has been observed that the resistivity of a thin-film layer having a thickness less than about 250 angstroms can be substantially influenced by the microstructure characteristics of the substrate surface upon which the thin film is formed. For a more detailed treatment of the effect of certain substrates on resistivity values, reference should be made to "Effect of Ceramic Substrates on the Resistance of Vacuum Deposited Thin Metal Films," by B. Coffman and H. Thurnauer, Transactions of the Ninth Vacuum Symposium, American Vacuum Society, 1962, pages 89–95.

Summary of the invention

Briefly, the invented method of fabricating a plurality of thin-film resistors having substantially different resistor values in a single semiconductor device comprises the steps of forming a thin underlayer of low conductivity material upon and adherent to a portion of the surface of an insulating substrate, the underlayer being chosen so that the microstructure characteristics of its surface are substantially different from the microstructure characteristics of the substrate surface. A first thin film of resistive material is then formed upon and adherent to a portion of the underlayer surface. Next, or preferably simultaneously, a second thin film of resistive material is formed upon and adherent to a portion of the substrate surface separate from the underlayer. Each film is sufficiently thin so that the resistivity of a major portion thereof is substantially affected by the microstructure characteristics of the respective underlayer surface or substrate surface, whereby even when the first and second thin films have approximately the same geometry and the thickness and composition of the resistive material of each is approximately the same, the resistance value of the first resistor having the underlayer differs from the resistance of the second resistor by a substantial factor, say up to at least ten times.

The invented method of fabricating a plurality of metal thin-film resistors having different resistor values in a single semiconductor device represents an improvement over prior art resistors and processes in a number of ways. First, the need to make two or more precise masking and etching steps, a necessary process when two different resistive metals are used or when one resistor is formed upon the substrate surface and another is diffused into the substrate, is eliminated. With the invented method, only one precise masking step is necessary. Second, the need to form two or more resistors having extreme differences in geometry—a process that is difficult to control accurately—is eliminated. With the invented method, up to at least an order of magnitude difference in film resistivity can be achieved. For example, the resistance value of one resistor can be increased by a factor of up to at least 10 to 1 over the resistance value of the other resistor when both have the same geometry. Third, the need to form two or more resistors having different types of resistive material, where the ratio between resistors becomes unbalanced with changes in ambient because of different temperature coefficients and different drift values, is eliminated. With the invented method, the same type of resistivity material can be used, forming resistors having substantially the same characteristics. Hence, more precise matching is possible, stability is achieved, and the effect of change in ambient temperature upon the ratio between resistor values is minimized.

Description of the preferred embodiments

Figure 1:
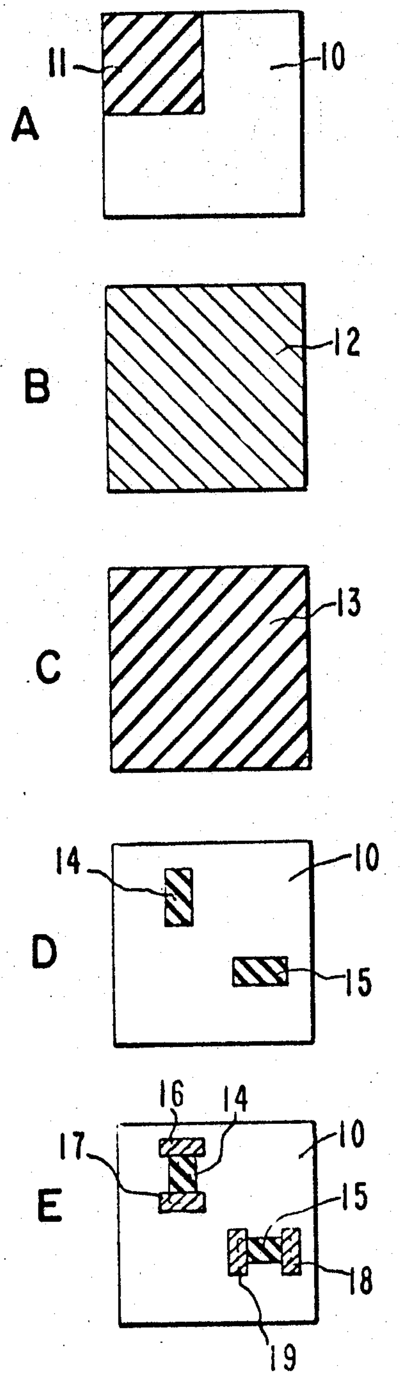
FIGS. 1A through 1E are top views of a portion of an insulating substrate showing the preferred method of forming two thin-film resistors thereon having substantially different resistance values.

Referring to FIG. 1A, the invented process begins by selecting an insulating substrate 10, such as that found on a typical integrated circuit. The substrate surface 10 may comprise an oxide of silicon. Silicon dioxide is preferred, because it is the usual surface of silicon integrated circuits. The oxide may be formed by thermal oxidization of silicon, formed by chemical vapor deposition or by sputtering.

Next, a thin underlayer of low conductivity material 11 is formed upon a portion of the insulating substrate 10. The underlayer material 11 is chosen so that the microstructure characteristics of its exposed surface are substantially different from the microstructure characteristics of the exposed substrate surface 10. When a thin layer of resistive film (preferably less than 250 angstroms thick) is deposited over the substrate 10 or underlayer 11 as described in the next step, the structure of the film itself, and hence its resistivity, can be affected by nonuniformities in the microstructure of the surface upon which the film nucleates and grows during deposition. Relatively gross amounts of smoothness or roughness in the surface which can be seen or measured by conventional techniques are not relied on to affect the film structure. Rather, it is the microstructure variations (under 100 angstroms) in the substrate or underlayer surface that may be used to produce substantial changes in resistor values. For example, the degree of crystallinity and the surface roughness can have a substantial affect on the resistivity value of the overlying film. These microstructure variations often may be too small to be seen or measured, except by an electron microscope or equivalent capable of resolving surface nonuniformities within tens of angstrom units. It has been found that when the substrate material 10 comprises oxidized silicon and the underlayer material 11 comprises amorphous silicon, the minute difference in microstructure characteristics of surfaces 10 and 11 are sufficient to cause a substantial difference (up to a factor of at least 10) in the resistance values of the thin film material deposited thereon. Other materials having different surface microstructures may be chosen. Amorphous silicon and silicon dioxide are particularly convenient materials on which to form resistors disposed on semiconductor structures. By amorphous silicon it is meant that the material is characterized by diffuse ring electron diffraction patterns indicative of an atomic structure having a minimum of long range order. The underlayer 11 should be at least as thick as the resistive material, but preferably less than 1,000 angstroms thick for ease of removal in a later step.

Any well-known deposition technique may be used to form the underlayer 11, including vacuum evaporation or sputtering, provided the temperature of deposition is kept low enough so as not to degrade any devices or metallic layers previously formed on the substrate 10; for example, electron beam deposition at around 300° C. may be performed. Because it is not necessary that the underlayer 11 be precisely delineated during this step, a rather coarse mechanical mask may be used to control deposition. Alternatively, the underlayer can be formed using the technique subsequently described in the steps relating to FIGS. 2A and 2B.

Referring to FIG. 1B, a thin-film layer, or sheet, of resistive material 12 is formed upon and adherent to the substrate 10 including the underlayer 11. The resistivity of the underlayer material 11 should be at least 100 times greater than that of the resistive material 12. Preferably, the resistive film material 12 comprises a composition of chromium disilicide. However, the resistive film may comprise at least one metal chosen from the group consisting of: cobalt, chromium, hafnium, iron, manganese, molybdenum, nickel, niobium, rhenium, tantalum, titanium, tungsten, vanadium, and zirconium. These metals, which are part of the transition group of metals on the periodic chart, are suitable for many of the well-nown deposition processes, such as sputtering or vacuum deposition by electron beam heating, and they have excellent refractory properties. Another advantage is that a semiconductor or low conductivity material may be added to a mixture of one or more of these metals to form the resistive material 12, thereby increasing or decreasing the resistivity as desired. For example, a semiconductor material such as silicon was mixed with chromium, there being over 15 percent chromium by weight. Whatever the mixture, however, the final resistive material 12 should not contain more than 90 percent by volume of uncombined or unreacted low conductivity or semiconductor material. Deposition of the thin-film layer or sheet of resistive material 12 may be by any of the commonly known chemical vapor deposition or sputtering techniques, or by vacuum deposition. Preferably, the layer 12 formed is less than 250 angstroms thick to ensure that the resistive value of layer 12 is substantially influenced by the microstructure characteristics of the underlying surface. If vacuum deposition is used, the temperature of the substrate 10 is kept around 300° C. (However, in some cases, depending upon the type of metal and the ratio of metal to insulating material used in the resistive material, any temperature in the range of room temperature to approximately 500° C. may be satisfactory. During vacuum deposition, the thickness can be monitored by a quartz crystal oscillator using techniques well-known in the art.)

In accordance with the teaching of applicant's copending U.S. patent application Ser. No. 600,247, filed Dec. 8, 1966, and assigned to the same assignee as this invention, an overlayer of low conductivity material 13 may be, if desired, deposited over the thin-film layer of resistive material 12, as shown in FIG. 1C. For example, silicon having a resistivity at least 100 times greater than that of the thin-film material 12 can be used for the overlayer 13. Any well-known deposition technique may be used, such as vacuum evaporation or sputtering, provided the temperature of deposition is kept low enough so as not to degrade the thin-film material 12, and provided the deposited overlayer 13 is adherent to the thin-film material 12. At this point, the resistive layers 14 and 15 are delineated by well-known photoresist and etching techniques, as shown in FIG. 1D.

Following delineating, contact may be made to the resistive material. For example, spaced metal contacts 16–19 can be formed over a portion of the resistive layers 14 and 15, there being a pair of metal contacts for each layer, as shown in FIG. 1E. If an overlayer has been formed as part of the resistive layers 14 and 15, contacts 16–19 should comprise a metallic material compatible with the overlayer material and capable of forming a conductive path through the overlayer portion of resistive layers 14 and 15 when the device is heated to a sufficient temperature for a sufficient time period (see applicant's copending U.S. patent application mentioned above). When silicon is used as the overlayer material, a good conductive metal for contacts 16–19 comprises aluminum approximately one-half to one micron thick, which can be deposited over the substrate 10. On the other hand, if germanium is used as the insulating material rather than silicon, an indium alloy could be used as a contact material. The deposition of the metal for the contacts 16–19 may be by vacuum evaporation, sputtering, or chemical vapor deposition, provided that the deposition temperature is such that the underlying resistive film is not degraded. The conductive material may be either masked during deposition or subsequently masked and etched into the desired contact pattern.

Finally, if an overlayer is used, the device is heated so that electrical connection can be made. The substrate 10 is heated in an inert atmosphere (for example, nitrogen) at a temperature (such as between 450° C. and 570° C. for a silicon-chromium resistor with a silicon overlayer) and for a time period (such as 2 to 20 minutes) sufficient to enable a conductive path to form that extends through the overlayer portion to the respective thin-film resistive material portion of resistive layers 14 and 15 and provides good ohmic contact between the respective thin-film resistive material portion and a respective metal contact 16–19. If an overlayer is not used, a similar heating cycle may be necessary to ensure ohmic contact between the thin-film resistive material and the overlying metal contact.

Figure 3:
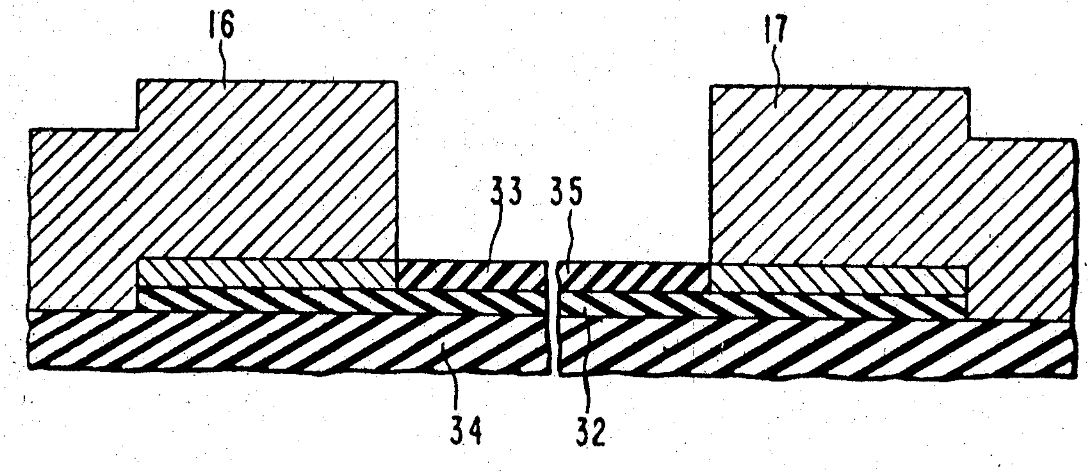
FIG. 3 is a simplified cross-sectional view of a thin-film resistor of FIG. 1E having an insulating underlayer.

A simplified diagram of the cross-sectional area of the resistor having the underlayer is indicated in FIG. 3. An insulating underlayer 32 is interposed between the resistive film 33 and the insulating substrate 34. A protective layer 35 overlies the resistive film 33. Spaced contacts 16 and 17 located upon a portion of the protective layer 35 make ohmic contact to the resistive film. For some applications it may be desirable to omit the overlayer 35 so that contacts 16 and 17 are located directly upon the resistive film 33.

Figure 4:
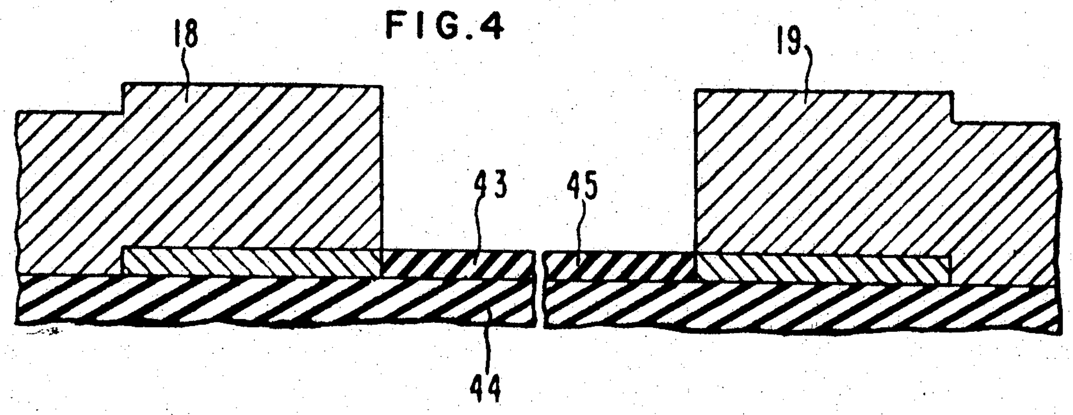
FIG. 4 is a simplified cross-sectional view of a thin-film resistor of FIG. 1E formed directly upon a substrate surface without an insulating underlayer interposed therebetween.

A simplified diagram of the cross-sectional area of the resistor without the underlayer is indicated in FIG. 4. Here, the resistive film 43 is located directly upon the insulating substrate 44. A protective layer 45 may overlie the resistive film 43. Contacts 18 and 19 are upon and adhere to the protective layer 45 and make ohmic contact to the resistive film 43. However, as mentioned above, for some applications it may be desirable to omit the protective layer 45, so that spaced contacts 18 and 19 are located directly upon the resistive film 43.

Referring to FIGS. 2A through 2E, an alternative method for the invented process involves controlling the geometry of the underlayer and the thin-film layers of resistive material by deposition through masks conforming to the desired geometrical shape. Although the previously described method is preferred, because with it resistors can be formed with a precision of an order of magnitude higher than resistors formed with the above alternative method, the alternative method is satisfactory for many applications, especially where highly precise resistors are not of prime importance.

Figure 2:
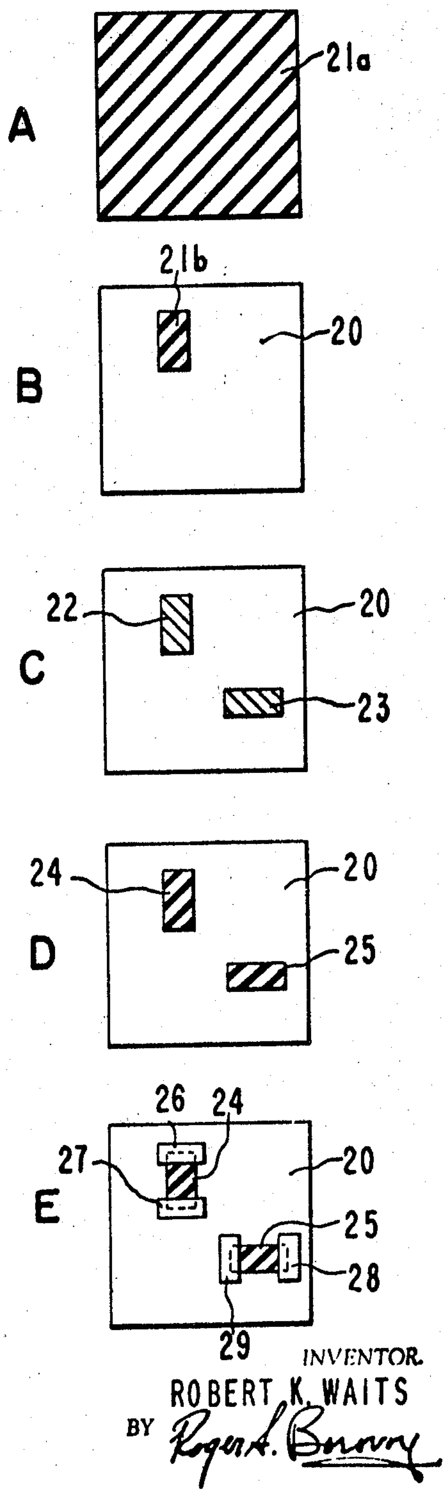
FIGS. 2A through 2E are top views of a portion of an insulating substrate showing an alternative method of forming two thin-film resistors thereon having substantially different resistance values.

The low-conductivity underlayer material may be formed by several methods. The first, as shown in FIG. 2A, comprises depositing a sheet 21A of underlayer material over a substrate surface, and then removing all but a predetermined portion 21B, as indicated in FIG. 2B. A second method, also shown in FIG. 2B, comprises depositing the underlayer material 21B through a mask onto the insulating substrate 20, the mask being formed so that the underlayer 21B is deposited only at a predetermined position. Again, material for the underlayer 21B is chosen so that the microstructure characteristics of the surface thereof are substantially different from the microstructure characteristics of the substrate surface. Referring to FIG. 2C, a mask with openings conforming to the desired resistive film geometry is next placed over the substrate surface 20, and thin films of resistive material 22 and 23 are deposited through the exposed portions of the mask directly onto the substrate 20 using one of the deposition techniques mentioned previously. Preferably, the thin films are deposited simultaneously, thin film 22 being formed upon and adherent to the underlayer 21B, and thin film 23 being formed upon and adherent to the insulated substrate 20 and separated from the insulating underlayer 21B. Both thin films 22 and 23 should be less than 250 angstroms in thickness to ensure that the resistive value of a major portion of each can be substantially influenced by the microstructure characteristics of the respective underlayer and substrate surface. If desired, thin overlayers 24 and 25, comprising low conductivity material having a resistivity value at least 100 times greater than that of the thin films 22 and 23, may be deposited over the thin films 22 and 23, as shown in FIG. 2D. The same mask used for deposition of the thin films 22 and 23 may be used for deposition of the overlayers 24 and 25. Next, as shown in FIG. 2E, spaced metal contacts 26–29 are formed, a pair of contcats for each thin-film resistor, preferably using the method previously described with reference to FIG. 1E.

The table shows the effect of using an underlayer to change resistance values. Two different resistors, each having a similar chromium disilicide composition and similar geometries, were delineated from a film deposited by glow discharge diode sputtering in argon, one of the two resistors being formed on a substrate surface of silicon dioxide and the other being formed on an underlayer surface of amorphous silicon approximately 500 angstroms thick. The underlayer had been vacuum deposited over a portion of the substrate by electron-beam techniques at a substrate temperature of approximately 300° C. As indicated in the table, a resistive film formed over the underlayer of silicon (Si) had higher sheet resistance values than one formed over the substrate of silicon dioxide ($SiO_2$). Also, the difference in resistive values between a resistor having a silicon underlayer and one formed over a silicon dioxide substrate only was greater as the resistive film itself became thinner. For example, when the film thickness was around 160 angstroms, the ratio of sheet resistivity of the two resistors was 20, whereas a film thickness of around 210 angstroms produced a ratio of only 2.5. For best results, it is recommended that the thickness of the resistive film not be greater than 250 angstroms.

TABLE

| Resistor No. | Underlayer | Thickness, angstroms | Sheet resistance, $\rho_s$ (KΩ/sq.) | Ratio $\rho_s W/SiO_2/\rho_s W/Si$ |
|---|---|---|---|---|
| 1 | $SiO_2$ | ~100 | 1.9 | ~40 |
| 2 | Si | ~100 | ~70 | |
| 3 | $SiO_2$ | 160 | 1.5 | 20 |
| 4 | Si | 160 | 30 | |
| 5 | $SiO_2$ | 210 | 2.4 | 2.5 |
| 6 | Si | 210 | 6.1 | |
| 7 | $SiO_2$ | 300 | 1.2 | 1.3 |
| 8 | Si | 300 | 2.4 | |

The improved method of fabricating a plurality of insulator-metal thin-film resistors having substantially different resistor values in a single semiconductor device can be accomplished with a minimum of complexity and in a manner consistent with present processing technology. While the present invention has been illustrated and described hereinbefore with respect to specific processes and embodiments, it will be appreciated that numerous variations and modifications may be made without departing from the scope and spirit of the invention.

I claim:

1. A single semiconductor device with a plurality of thin-film resistors having substantially different resistor values comprising:

an insulating substrate surface of silicon dioxide;

a thin underlayer of amorphous silicon upon and adherent to one portion of said substrate surface;

a first thin film of resistive material upon and adherent to a portion of said underlayer;

a second thin film of resistive material upon and adherent to a portion of said substrate surface separate from said underlayer surface, whereby said first and second thin films may have the same geometry and composition of resistive material, but the resistance value of the resistor having said underlayer substantially differs from the resistance of the other resistor.

2. The device recited in claim 1 wherein said first and second thin resistive films are less than 250 angstroms thick comprise a composition of chromium and silicon containing from 15 to 40 atomic percent chromium; and said amorphous silicon underlayer has a resistivity at least 100 times greater than, and is at least as thick as, said resistive film material.

References Cited

UNITED STATES PATENTS 3,310,711 3/1967 Hangstefer.

E. A. GOLDBERG, Primary Examiner

U.S. Cl. X.R.

317—101; 338—308, 314